(12) United States Patent
Tsuchiya et al.

(10) Patent No.: US 7,180,249 B2
(45) Date of Patent: Feb. 20, 2007

(54) SWITCHING ELEMENT DRIVING CIRCUIT AND DISCHARGE LAMP LIGHTING APPARATUS

(75) Inventors: Toshiyuki Tsuchiya, Shizuoka (JP); Masayasu Ito, Shizuoka (JP); Takao Muramatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/219,510

(22) Filed: Sep. 1, 2005

(65) Prior Publication Data

US 2006/0049776 A1    Mar. 9, 2006

(30) Foreign Application Priority Data

Sep. 7, 2004    (JP) .......................... P.2004-259889

(51) Int. Cl.
*H05B 41/16*    (2006.01)

(52) U.S. Cl. ................. 315/274; 315/276; 315/278

(58) Field of Classification Search ............... None
See application file for complete search history.

(56) References Cited

U.S. PATENT DOCUMENTS

| 5,514,921 A * | 5/1996 | Steigerwald ................ 307/125 |
| 7,045,970 B2 * | 5/2006 | Lecheler et al. ............. 315/274 |
| 2005/0035719 A1 * | 2/2005 | Dellian et al. ............... 315/244 |

FOREIGN PATENT DOCUMENTS

JP    07-169584    7/1995

* cited by examiner

*Primary Examiner*—Tuyet Thi Vo
(74) *Attorney, Agent, or Firm*—Fish & Richardson P.C.

(57) ABSTRACT

Switching elements S1, S2 connected in series are provided on the secondary side of a pulse transformer T to which an input voltage is supplied from a DC power supply E. On the primary side of the pulse transformer T, switching element S3, S4 are provided, and a regenerating unit RG including a current limiting inductor L1 and a regenerating inductor L2 is connected to the DC power supply E and the primary side of the pulse transformer T. A current is limited by the inductor L1 during an on time of the element S3 or S4, whilst a current is regeneratively supplied to the DC power supply E by using the inductor L2 during the off time of the elements S3, S4.

5 Claims, 8 Drawing Sheets

I1: CURRENT FLOWING UPON TURNING ON OF S3 OR S4
I2: CURRENT FLOWING UPON TURNING OFF OF S3 AND S4

SWITCHING ELEMENT DRIVING CIRCUIT AND DISCHARGE LAMP LIGHTING APPARATUS

TECHNICAL FIELD

The present disclosure relates to a technique for realizing the reduction of power loss and the improvement of electric efficiency in a circuit configuration which employs a pulse transformer to drive a plurality of switching elements by a rectangular signal.

BACKGROUND

In a half-bridge type circuit or a full-bridge type circuit, an arm formed by connecting two semiconductor switching elements in serial is used. A means which applies a rectangular-wave shaped voltage or a trapezoidal-wave shaped voltage to the respective elements is employed to drive the elements.

FIG. 10 is a diagram showing an example of such a driving circuit a.

In the figure, FETs (field effect transistors) serving as switching elements S1, S2 are connected in series on the secondary side of a pulse transformer T. The gate of the FET used as the switching element S1 is connected to the start end side of a secondary winding T2$h$ and the drain thereof is connected to a DC power supply terminal b of a predetermined voltage. The gate of the FET used as the switching element S2 is connected to the termination end side of a secondary winding T2$l$ and the source thereof is grounded. The drain of this FET is connected to the source of the former FET (S1)

A DC power supply "E", represented by the symbol for a constant voltage supply, is connected to a coupling point between primary windings T1$h$, T1$l$ of the pulse transformer T so as to supply a predetermined voltage to these primary transformers. An FET (which constitutes a switching element S3) is connected to the primary winding T1$h$ through a resistor R1, whereas an FET (which constitutes a switching element S4) is connected to the primary winding T1$l$ through a resistor R2. Each of these FETs is configured in a grounded-source type and the drains of these FETs are connected to the corresponding primary windings through the corresponding resistors, respectively.

FIG. 11 is a graph showing the temporal changes (i.e., as a function of time "t") of a voltage "Vgs(t)" (shown as a dotted line) between the source and the gate of the FET used as the switching element S1, and a current "I(t)" flowing through the resistor R1 assuming that the switching element S1 is switched by driving the switching element S3.

In the case where the switching element is switched by using a rectangular-wave shaped voltage or a trapezoidal-wave shaped voltage, it is necessary to supply electric charges quickly to the gate capacitance so as to perform the charging and discharging operation, whereby the current I(t) exhibits a steep pulse shape. However, when the charge and discharge speed is too fast, the peak value of the current becomes too high, which may cause breakdown of the FET. Thus, in this example, the resistors R1 and R2 are used as limiting elements for suppressing the peak value of the current flowing during a charging and discharging operation.

In the foregoing circuit configuration, a problem may occur if a measure for reducing the power loss is not performed adequately.

For example, in the circuit of FIG. 10, when switching the elements S1 and S2 at a high frequency by controlling the driving operations of the elements S3 and S4, the power loss of the resistors R1 and R2 increases and hence a problem arises that the electric efficiency of the entire circuit degrades.

It is possible to increase the electric efficiency by regenerating energy consumed in the current limiting resistors on the power supply side. However, in this case, when the regeneration is accompanied by a complicated circuit configuration and control method, problems arise in connection with cost reduction, reduction of the number of parts, etc.

SUMMARY

In some implementations of the present invention, a simple and low-loss configuration of a switching element driving circuit is provided for obtaining a rectangular or trapezoidal-wave shaped output voltage, as well as a discharge lamp lighting apparatus using the circuit.

A switching element driving circuit according to the invention may include a configuration which receives an input voltage from a DC power supply and alternately switches first and second switching elements connected in series on the secondary side of a pulse transformer. The switching element driving circuit may include the following features.

A signal from one of the secondary windings of the pulse transformer may be supplied to the first switching element, and a signal from the other secondary winding may be supplied to the second switching element.

On the primary side of the pulse transformer, third and fourth switching elements may be provided, the third switching element may be coupled to one of primary windings of the pulse transformer, the fourth switching element may be coupled to the other of the primary windings of the pulse transformer, and a regenerating unit, which includes a first inductor for limiting a current during an "on" time of the third or fourth switching element, and a second inductor for performing a regenerating operation during an "off" time of the third and fourth switching elements, may be connected to the DC power supply and the primary side of the pulse transformer.

A discharge lamp lighting apparatus according to the invention may be arranged in a manner that a DC-AC converter, which receives a DC input voltage for conversion into an AC voltage, may include a pulse transformer and a configuration for alternately switching first and second switching elements connected in series on a secondary side of the pulse transformer. The switching element driving circuit may be used in the DC-AC converter.

Thus, according to the invention, the current limitation during the "on" time of the third or fourth switching element may be performed by the first inductor without using a resistor, and energy may be regeneratively supplied to the DC power supply by using the second inductor during the "off" time of the third and fourth switching elements.

One or more of the following advantages may be present in some implementations. The circuit loss may be reduced to improve efficiency without complicating the configuration or operation of the circuit, whereby the cost of the circuit can be reduced.

In the configuration where the second inductor is connected in series with the first conductor, when a current from the third or fourth switching element is limited by the first inductor, energy accumulated in the first inductor may be transferred directly to the second inductor or transferred indirectly to the second inductor through a capacitor, and the energy may be regeneratively supplied to the DC power supply during the "off" time of the third and fourth switching elements. Thus, electric efficiency can be improved.

It is preferable to couple the first and second inductors magnetically in order to simplify the configuration and operation of the circuit and to reduce the cost, etc.

Further, in a configuration where one end of the capacitor is coupled to a coupling terminal between the terminal of the first inductor and the primary side circuit of the pulse transformer and the other end of the capacitor is coupled to the second inductor, energy may be transmitted to the second inductor through the capacitor from the first inductor during the "off" time of the third and fourth switching elements, and energy accumulated in the capacitor may be discharged during the "on" time of the third or fourth switching element, whereby circuit loss can be reduced.

When the DC-AC conversion circuit, including the aforementioned switching element driving circuit, is used for a discharge lamp lighting apparatus, the loss of the entire circuit can be reduced, with various advantages in the miniaturization of the lighting circuit and the cost reduction, etc.

Other features and advantages may be readily apparent from the following detailed description, the accompanying drawings and the claims.

DETAILED DESCRIPTION

Figure 1:
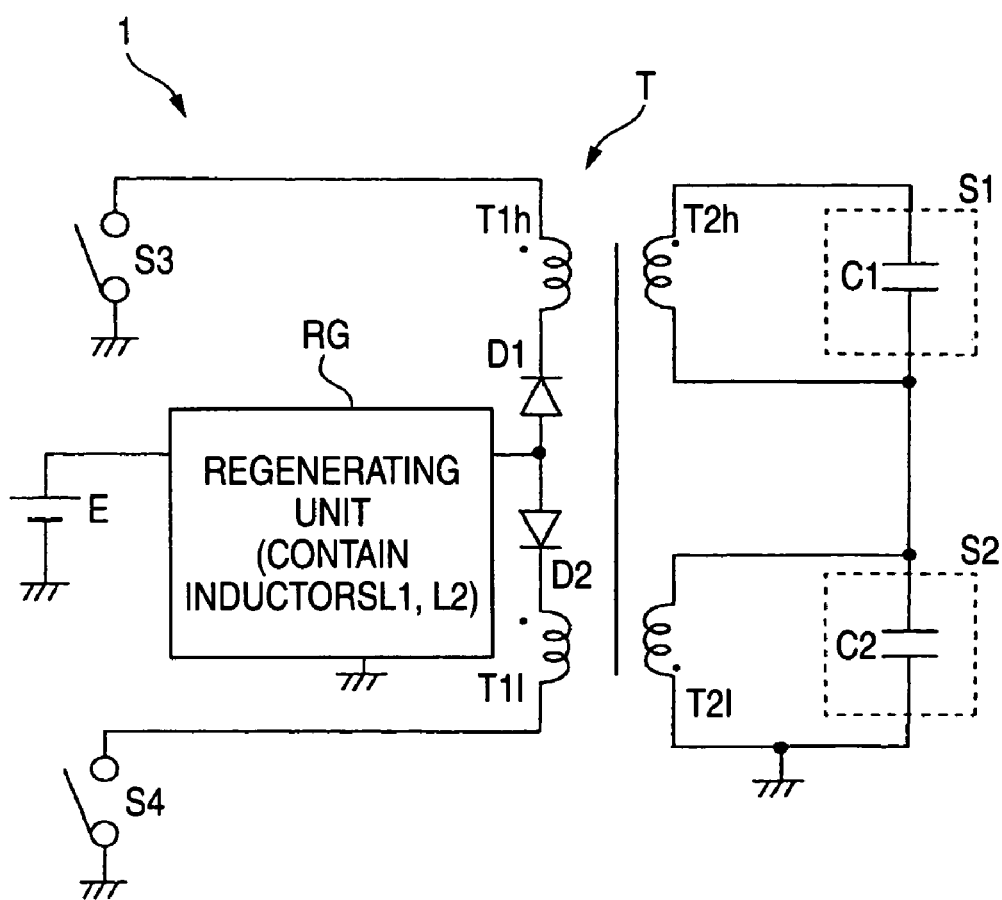
FIG. 1 is a diagram showing an example of the basic configuration of the present invention.

FIG. 1 is a diagram showing an example of a basic configuration of a switching element driving circuit according to the invention.

In a switching element driving circuit 1, capacitive loads C1 and C2 are provided on the secondary side of a pulse transformer T and are connected to secondary windings T2$h$, T2$l$, respectively. The loads C1, C2 correspond to the capacitances (loads) of switching element S1, S2, respectively. In some applications, a bipolar transistor or a unipolar transistor may be used as a switching element.

On the primary side of the pulse transformer T are diodes D1, D2 and switching element S3, S4. Each switching element is represented in the drawings by a symbol of a switch. The switching elements are coupled, respectively, to primary windings T1$h$, T1$l$, and a regenerating unit RG.

The regenerating unit RG is connected to a DC power supply E of a predetermined voltage and also connected to a coupling point between the anodes of the diodes D1, D2. As described below, the regenerating unit includes two inductors (L1, L2) and functions to regenerate and supply energy accumulated in the inductor (L1) to the DC power supply E during a time period when both the elements S3 and S4 are in "off" states.

The switching element S3 is connected to the primary winding T1$h$ of the pulse transformer T, and the switching element S4 is connected to the wining T1$l$.

As described above, resistor loss may occur in some configurations (see FIG. 10) in which the resistors R1, R2 are connected to the switching element S3, S4, respectively. Thus, as an alternative, the invention uses inductive elements (inductors), each of which has a relatively small resistance component, to suppress power loss. However, use of the inductive elements alone cannot maintain the voltage applied to the loads at a constant value because of the resonance between the inductances of the inductive elements and the static capacitances of the loads (C1, C2). Thus, it is necessary to limit the direction and time of currents flowing through the loads.

As shown in the figure, the direction of the primary current is restricted by each of the diodes D1, D2. Further, the anodes of the diodes are connected to each other and also are connected to the regenerating unit RG. The cathodes of the diodes D1, D2 are connected to the switching element S3, S4 through the primary windings T1$h$, T1$l$ respectively. The time period for flowing the current is limited in accordance with the "on" time of the switching element S3, S4.

The following modes can occur in the regenerating unit RG.

Figure 2:
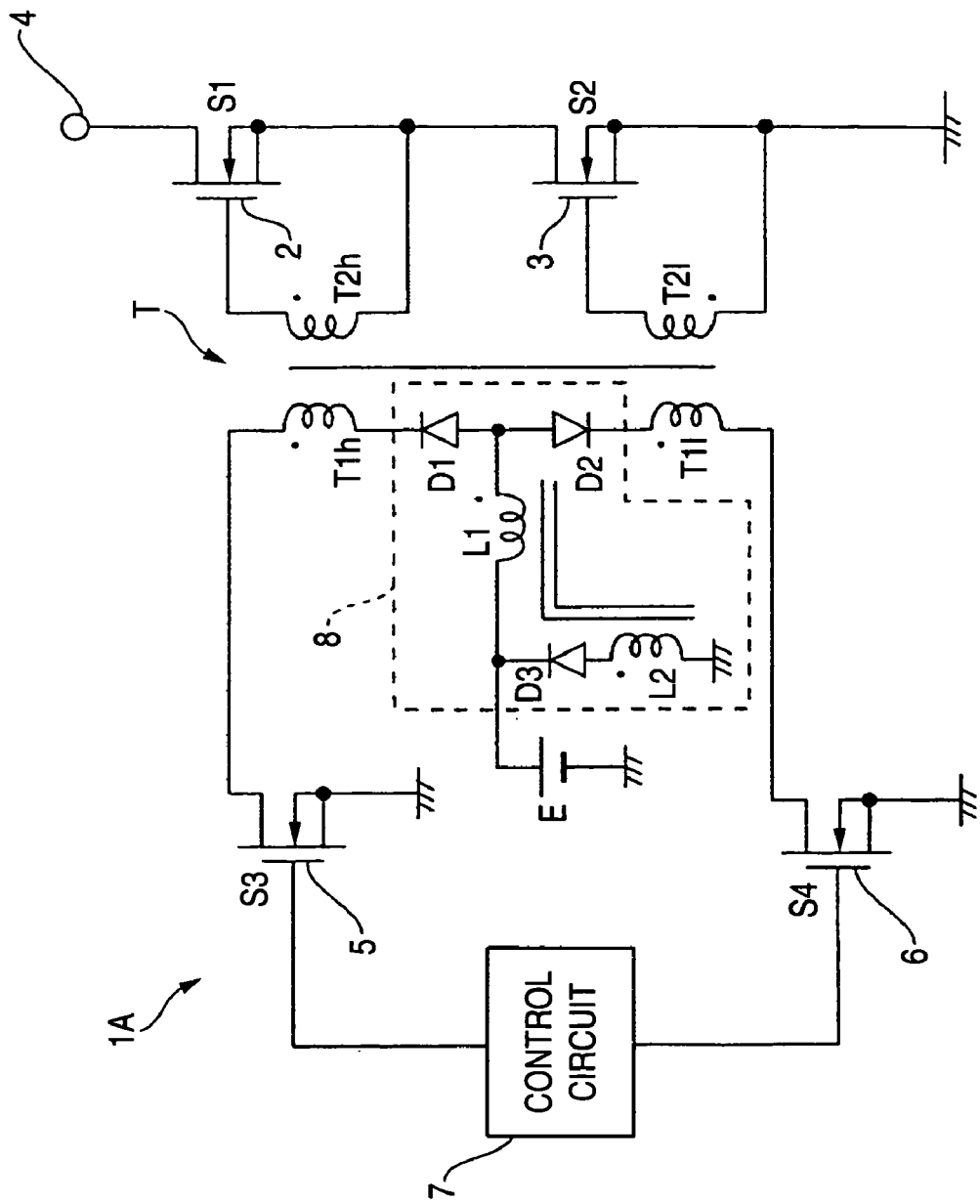
FIG. 2 is a circuit diagram showing an example of the configuration of the invention.

(I) A first mode for regeneratively supplying energy accumulated in the current limiting first inductor "L1" to the DC power supply by a transformer formed by the first inductor and the regenerative second inductor "L2" (see FIG. 2).

Figure 5:
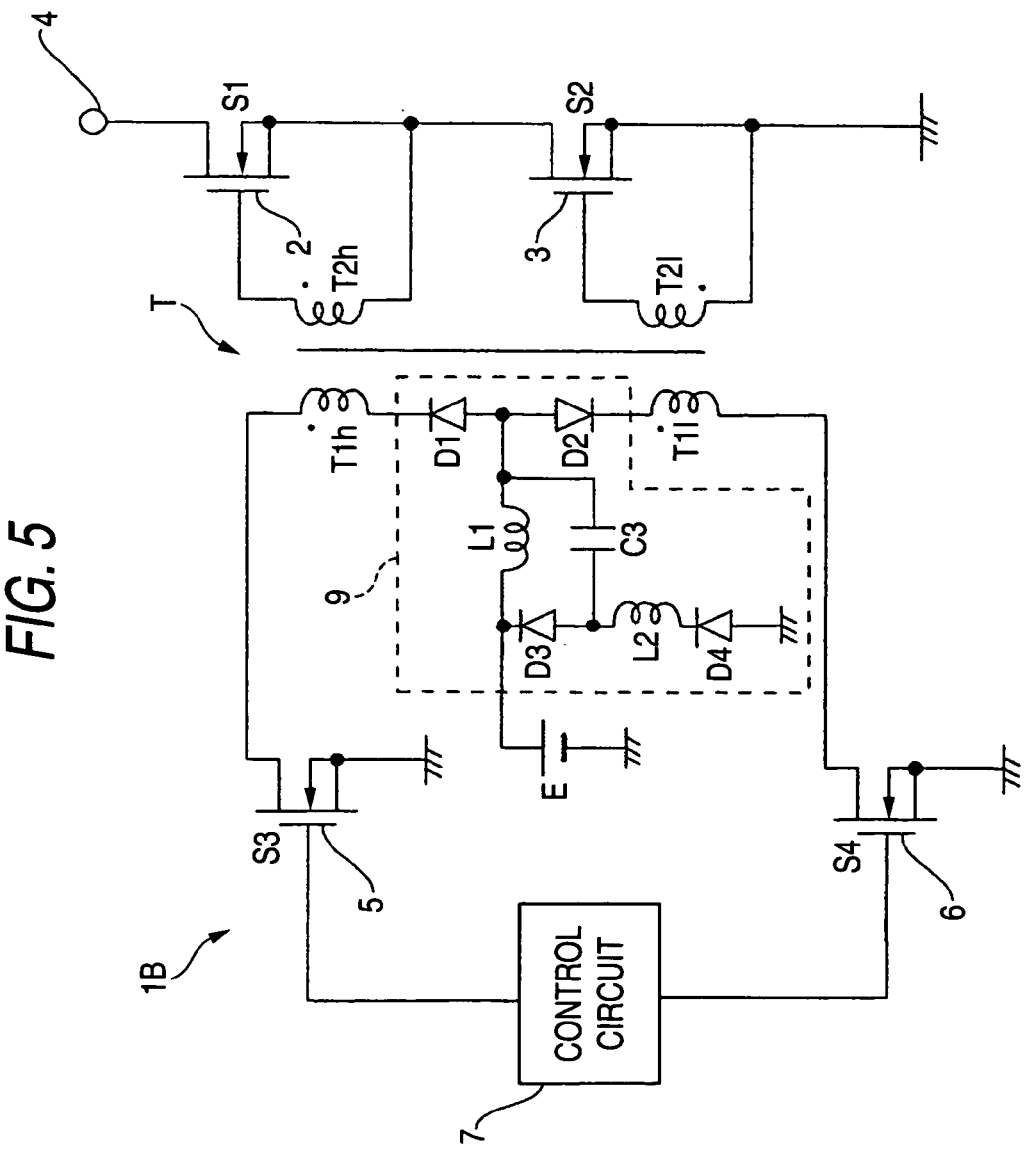
FIG. 5 is a circuit diagram showing another example of the basic configuration of the invention.

(II) A second mode for regeneratively supplying energy accumulated in the current limiting inductor to the DC power supply and also for supplying the energy to the load (i.e., the input capacitances of the switching elements) (see FIG. 5).

FIG. 2 is a diagram showing an example of the configuration of the first mode (I) of the switching element driving circuit.

FETs 2, 3, respectively serving as the switching elements S1, S2, are connected in series On the secondary side of the pulse transformer T that constitutes a switching element driving circuit 1A. That is, the gate of the FET 2 used as the switching element S1 is connected to the start end side of the secondary winding T2$h$, and the drain of the FET 2 is connected to a DC power supply terminal 4 (connected to the DC power supply) of a predetermined voltage. The gate of the FET 3 used as the switching element S2 is connected to the termination end side of the secondary winding T2$l$, and the source of the FET 3 is grounded. The drain of the FET 3 is connected to the source of the FET 2.

The input voltage from the DC power supply E (represented by the symbol for a constant voltage supply) is supplied to the primary windings T1$h$, T1$l$ of the pulse transformer T through the inductor L1. The inductor is connected to the primary windings T1$h$, T1$l$ through the diodes D1, D2, respectively. That is, one end of the inductor L1 is connected to the anodes of the diodes D1, D2. The cathode of the diode D1 is connected to the termination end side terminal of the primary winding T1h, whilst the cathode of the diode D2 is connected to the start end side terminal of the primary winding T1l. The start end side terminal of the primary winding T1h is connected to an FET 5 (the switching element S3), whereas the termination end side terminal of the primary winding T1l is connected to an FET 6 (the switching element S4). The gates of the FETs 5, 6 are supplied with driving signals from a control circuit 7, whereas those switching elements are alternately switched with a "dead" time in between.

The inductor L2 is connected at one end to the DC power supply E and the inductor L1 through a diode D3 connected in the forward direction. The inductor L2 constitutes the transformer together with the inductor L1. These inductors may be magnetically coupled by using a common iron core. A regenerating circuit 8 (see the area within the dotted line) is formed by the inductors L1, L2 connected in series and the diodes D1 to D3.

Figure 10:
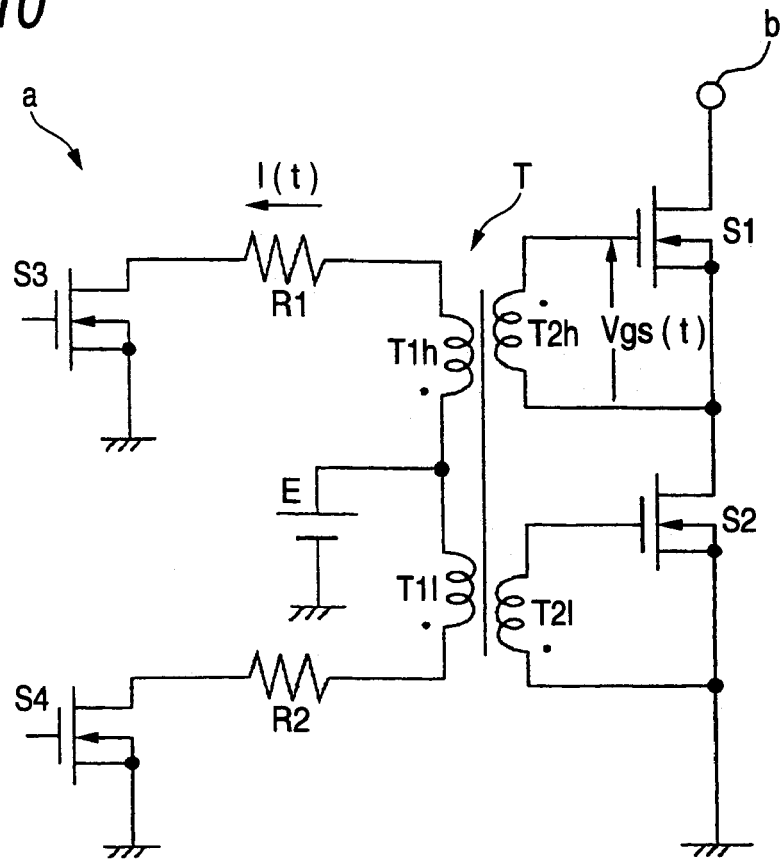
FIG. 10 is a circuit diagram showing an example of a conventional configuration.
Figure 11:
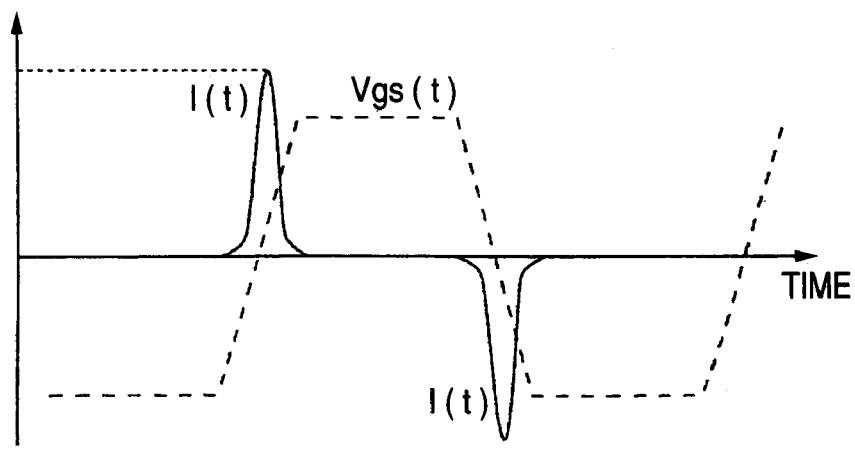
FIG. 11 is a diagram showing schematic waveforms of a driving voltage and a driving current for explaining the switching operation.

One of the differences of this configuration from the configuration of FIG. 10 is that the switching elements S3, S4 are respectively connected to the primary windings without through-resistors, and the current limitation is performed by the inductor L1.

Figure 3:
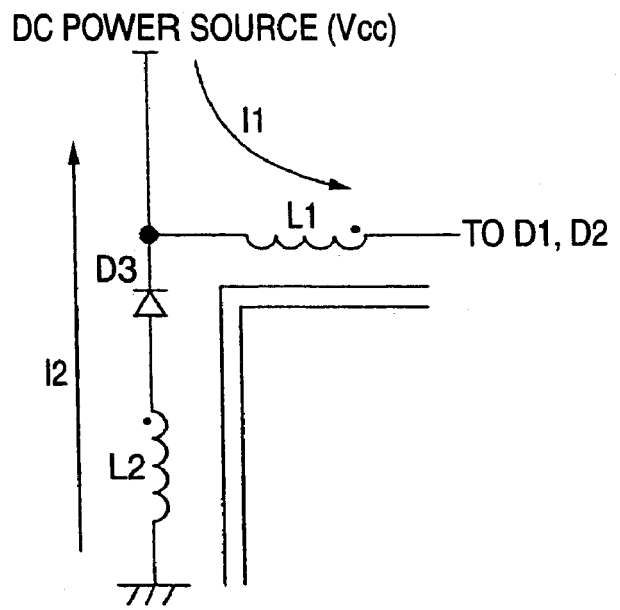
FIG. 3 is a diagram for explaining the operation of a regenerating circuit of FIG. 2.

FIG. 3 is a diagram for explaining the operation of the regenerating circuit 8. Currents "I1", "I2" shown by arrows in the figure represent the following items.

"I1" is a current flowing at the "on" state of the element S3 or S4.

"I2" is a current flowing during the "dead" time (i.e., a ime period where both the elements S3 and S4 are in the "off" state.

In this example, in the transformer with the current limiting inductor L1 and the regenerating inductor L2, the inductors are coupled in such that their polarities are opposite to each other. Thus, a current flows in the direction from the DC power supply E to the diodes D1, D2, as indicated by the arrow of the current I1 during the "on" time of the element S3 or S4. That is, the current is prevented from flowing into the inductor L2 as a result of the presence of the diode D3. On the other hand, a regenerating current flows toward the DC power supply E from the inductor L2 during the "off" time (i.e., "dead" time) of the elements S3 and S4.

In the configuration where the winding directions of the inductors L1, L2 are defined in the illustrated manner and the diode D3 is provided between the DC power supply E and the inductor L2, the current from the switching element is limited by the inductor L1 during the "on" time of the element S3 or S4, and energy accumulated in the inductor L1 is regeneratively supplied to the DC power supply during the "dead" time of the elements S3 and S4.

For example, when the switching element S3 receives the signal from the control circuit 7 so as to be placed in the "on" state, the current I1 flows through the inductor L1. However, the current does not flow into the inductor L2 due to the setting of the direction of the diode D3 and the winding directions of the inductors L1, L2 (i.e., energy is not transmitted from the inductor L1 to the inductor L2). Thus, in this case, energy is accumulated in the inductor L1. Thereafter, the switching element S3 is turned off in response to the signal from the control circuit 7. During this "dead" time, the current does not flow into the inductor L1, and the energy accumulated in this inductor is transmitted to the inductor L2 (as a result of the magnetic coupling between the inductors L1, L2) and so the energy is regeneratively supplied to the DC power supply E.

Figure 4:
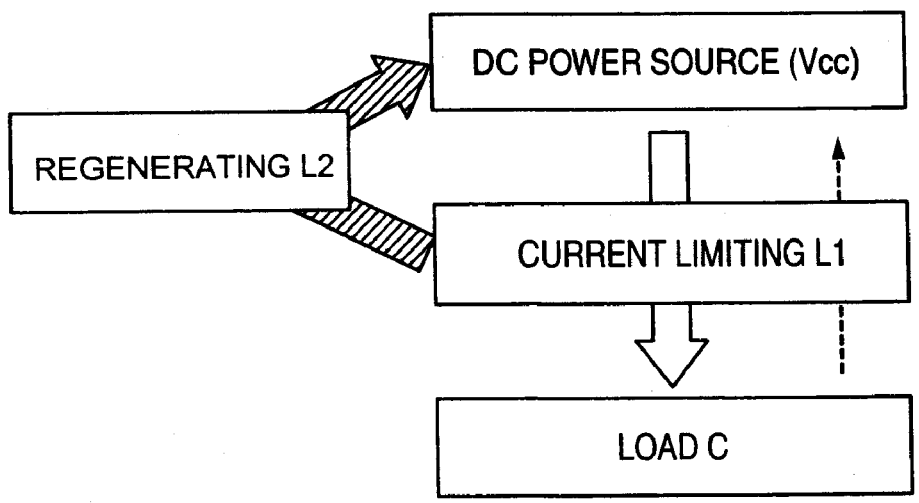
FIG. 4 is a schematic explanatory diagram showing the flow of energy.

FIG. 4 is a schematic explanatory diagram showing the flow of energy in the switching element driving circuit in which the regenerating circuit 8 is incorporated. In the figure, "a load C" corresponds to the input capacitances of the switching elements S1, S2 (e.g., the gate capacitances of the FETs).

A white bold line in the figure represents the moving direction of energy during the "on" time of the element S3 or S4 (that is, a flow directed to the load C through the inductor L1 from the DC power supply). Further, a dark bold line in the figure represents the moving direction of energy during the "dead" time of the elements S3 and S4 (that is, a flow directed to the DC power supply through the inductor L2 from the inductor L1). An arrow represented by a dotted line (an arrow directed to the DC power supply through the inductor L1 from the load C) indicates the flow in the case where the switching element is placed in the "on" state next.

As described above, this example employs a configuration in which energy is directly returned to the DC power supply E during the "dead" time of the elements S3 and S4. Thus, the circuit configuration and its operation are simple.

FIG. 5 is a diagram showing an example 1B of the configuration of the second mode (II) of the switching element driving circuit.

This example differs from the configuration of FIG. 2 in the following ways:

A capacitor C3 is provided in parallel to the series connection of the inductor L1 and the diode D3;

one end of the inductor L2 is ground through a diode D4; and the inductors L1 and L2 are not magnetically connected.

That is, the other end of the inductor L2 is connected to the inductor L1 and the anodes of the diodes D1, D2 through the capacitor C3, whereas the one end of the inductor L2 is connected to the cathode of the diode D4 which anode is grounded.

In this example, a circuit 9 (see the area within the dotted line in the figure) for regenerating energy to the power supply and supplying energy to the load is configured by using the inductors L1, L2, the capacitor C3 and the diodes D1 to D4.

Figure 6:
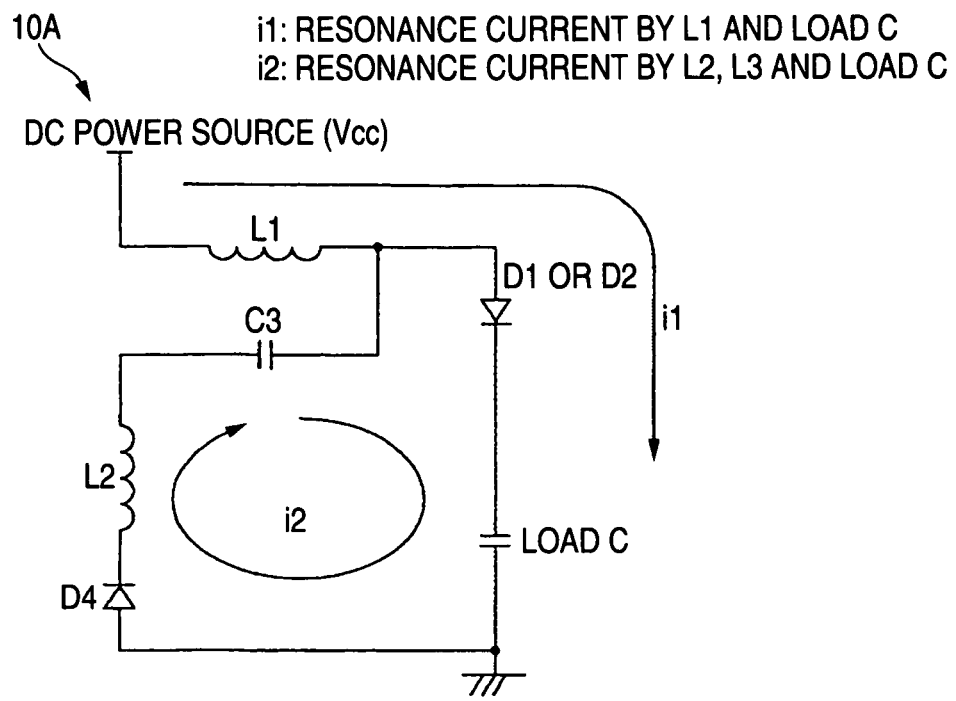
FIG. 6 is an equivalent circuit for explaining the operation of the circuit of FIG. 5 together with FIG. 7, wherein this figure shows a case where a switching element S3 or S4 is an on state.
Figure 7:
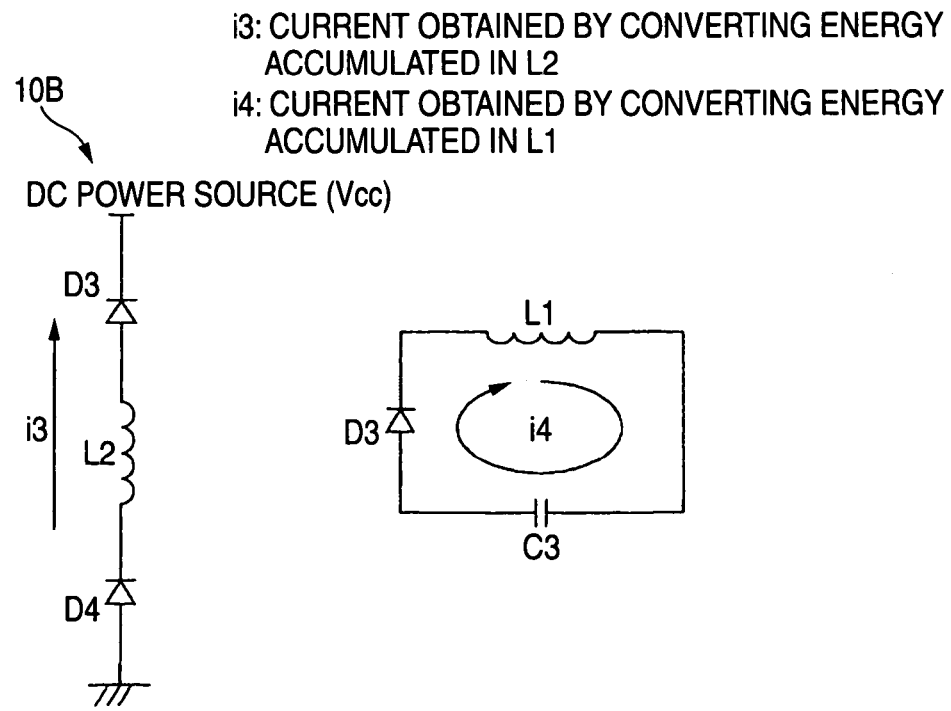
FIG. 7 is a diagram showing a case where both the elements S3 and S4 are in off states.

FIGS. 6 and 7 are equivalent circuit diagrams for explaining the operation of this circuit. The circuit 10A in FIG. 6 represents the "on" state of the element S3 or S4, whereas the circuit 10B in FIG. 7 represents the "off" state ("dead" time) of the elements S3 and S4.

Currents "i1", "i2" shown by arrows in FIG. 6 represent the following features:

"i1" is a resonance current resulting from the inductor L1 and the load C; and

"i2" is a resonance current resulting from the inductor L1, the capacitor C3 and the load C.

The load C represents a capacitance when converted into a value on the primary side.

As shown by the arrow for the current i1, a current flows from the inductor L1 toward the load C through the diode D1 (or D2). Further, as shown by the arrow for the current i2, another current flows toward the inductor L2, the capacitor C3 and the diode D1 I(or D2) along the forward direction of the diode D4. Energy is accumulated in the inductors L1, L2, and energy accumulated in the capacitor C3 is discharged.

Currents "i3", "i4" shown by arrows in FIG. 7 represent the following features.

"i3" is a current which is obtained by converting energy accumulated in the inductor L2; and "i4" is a current which is obtained by converting energy accumulated in the inductor L1.

The current i3 is directed in the forward direction of the diodes D3 and D4, that is, toward the DC power supply from the inductor L2, wherein energy accumulated in the inductor L2 is discharged. The current i4 is directed in the forward direction of the diode D3 toward the capacitor C3 from the inductor L1, wherein energy accumulated in the inductor L1 is discharged and energy is accumulated in the capacitor C3.

In this configuration, for example, energy accumulated in the inductor L1 during the "on" time of the switching element S3 is transferred to the capacitor C3 during the "off" time ("dead" time) of the elements S3 and S4. Next, during the time period where the switching element S4 is placed in the "on" state, the energy transferred to the capacitor C3 is distributed into the load C and the inductor L2. Thereafter, the energy transferred to the inductor L2 is regeneratively supplied to the DC power supply E during the "off" time of the elements S3 and S4.

Figure 8:
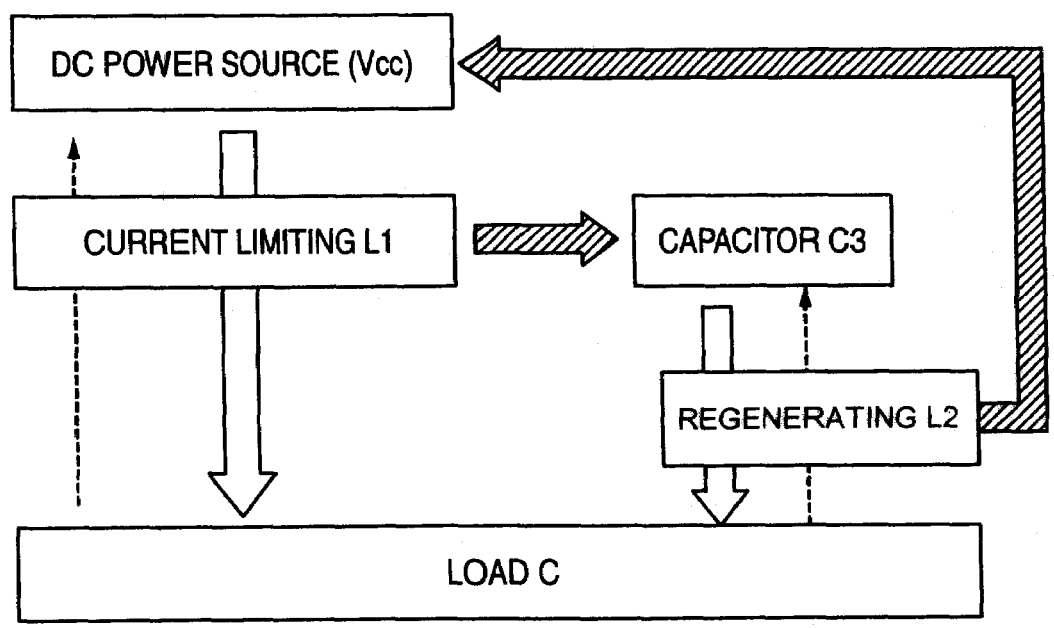
FIG. 8 is a schematic explanatory diagram showing the flow of energy.

FIG. 8 is a schematic explanatory diagram showing the flow of energy in the switching element driving circuit in which the circuit 9 is incorporated.

A white bold line in the figure represents the moving direction of energy during the "on" time of the element S3 or S4, and represents a flow directed to the load C through the inductor L1 from the DC power supply and another flow directed to the load C through the inductor L2 from the capacitor C3. Further, a dark bold line in the figure represents the direction of energy during the "dead" time of the elements S3 and S4, and represents a flow directed to the capacitor C3 from the inductor L1 and a flow directed to the DC power supply from the inductor L2. Arrows represented by dotted lines (i.e., the arrow directed to the DC power supply from the load C and another arrow directed to the capacitor C3 through the inductor L2 from the load C) indicate flows in the case where the switching element is placed in the "on" state next.

Since the currents flow into the load C through two systems, this configuration is slightly complicated as compared with the configuration of FIG. 2, but effective from the viewpoint that energy consumed at the switching element driving circuit can be reduced. That is, although the circuit loss is caused by the resistance components of the used elements, the internal impedance of the power supply itself, the on-resistances of the switching elements etc., energy regeneratively returned to the DC power supply is consumed by the driving circuit again. Supposing that 60% of the entire energy is returned regeneratively, the regeneratively returned energy is consumed by the driving circuit again when the next switching operation is performed, and 40% of the regeneratively returned energy is lost. Thus, if part of the energy can be supplied to the load (capacitive components of the switching element S S1, S2), energy consumed in the driving circuit of energy supplied from the DC power supply can be reduced (the absolute value of the energy loss can be reduced even if 40% of the regeneratively returned energy is lost), whereby the circuit efficiency can be further improved.

Next, an explanation is provided for a discharge lamp lighting apparatus using the aforementioned switching element driving circuit.

Figure 9:
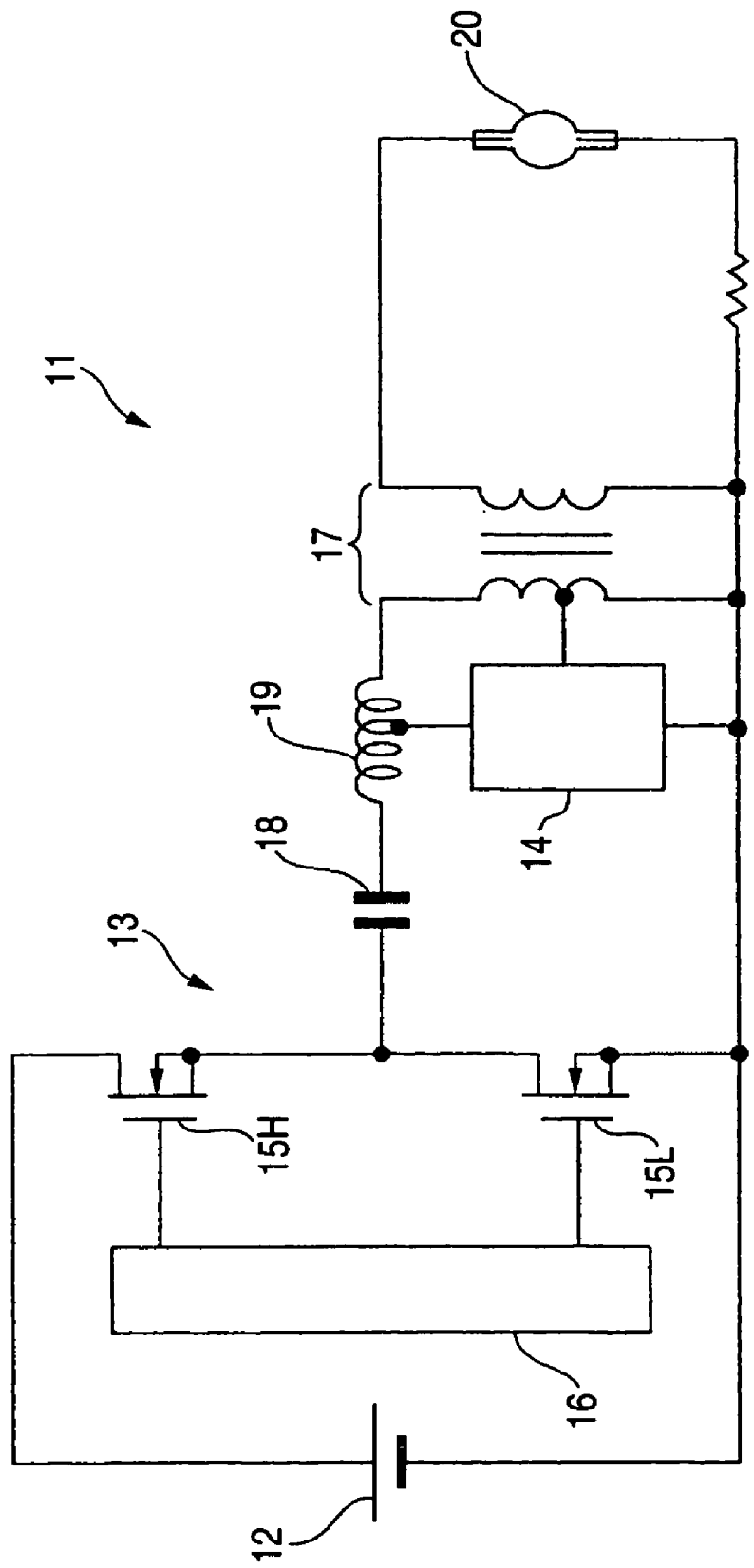
FIG. 9 is a diagram showing an example of the configuration of a discharge lamp lighting apparatus.

FIG. 9 is a diagram showing an example 11 of the discharge lamp lighting apparatus, which includes a DC-AC converter 13 being supplied with power from a DC power supply 12 and a start circuit 14.

The DC-AC converter 13 receives a DC input voltage from the DC power supply 12 so as to perform a DC-to-AC conversion and a boosting operation. In this example, the DC-AC converter is configured in a half-bridge type and includes switching elements 15H, 15L and a gate driving unit 16. In this example, an FET is used as each of the switching elements. The one end of the high-stage side element 15H (corresponding to the aforesaid switching element S1) is connected to the positive polarity side terminal of the DC power supply, and the other end thereof is grounded through the low-stage side element 15L (corresponding to the aforesaid switching element S2). The configuration of the switching element driving circuit (1A or 1B) is used as the gate driving unit 16. According to this configuration, the switching elements 15H, 15L are controlled so as to be alternately switched with a predetermined "dead" time in between.

This example includes a power conversion transformer 17 and uses a circuit configuration with a resonance capacitor 18 and an inductor 19.

The start circuit 14 supplies a start signal to a discharge lamp 20 and is arrange such that an output voltage thereof is increased by the transformer 17 and then applied to the discharge lamp 20 (that is, the start signal is superimposed on the AC converted output and then the superimposed output is supplied to the discharge lamp 20).

Although this example employs the half-bridge type configuration using the switching elements 15H, 15L, the present invention may employ a full-bridge type configuration using four switching elements instead of the half-bridge type configuration. For example, the DC input voltage may be converted into a desired level, then the converted DC input voltage is converted into an AC output by an inverter and subsequently supplied to a discharge lamp.

In the lighting control of a discharge lamp, it may be required to supply an optimum voltage and an optimum power in any of the load states because the load changes to a large extent. To this end, frequency control is performed for the switching elements forming each arm of the bridge type circuit. Thus, the switching frequency also changes in accordance with the load state, and the driving loss of the bridge changes depending on the frequency (that is, the loss increases as the frequency increases). Therefore, although it is necessary to select the elements and design the heat dissipation property suitably in view of the circuit loss, etc., since the power loss is reduced by employing the aforementioned switching element driving circuit, it is not necessary to use expensive elements and the restriction on the circuit design, etc., can be lightened. In other words, it is not necessary to take excessive measures against the loss in accordance with a load change range. Therefore, the invention may be effective for providing a reduction in the amount of heat, the miniaturization of the lighting apparatus, the reduction in cost, etc.

What is claimed is:

1. A switching element driving circuit to receive an input voltage from a DC power supply and alternately switch first and second switching elements connected in series on a secondary side of a pulse transformer, wherein, during operation, a signal from a first secondary winding of the pulse transformer is supplied to the first switching element, and a signal from a second secondary winding of the pulse transformer is supplied to the second switching element, the switching element driving circuit comprising:

third and fourth switching elements on a primary side of the pulse transformer, wherein the third switching element is coupled to one of the primary windings of the pulse transformer, the fourth switching element is coupled to the other of the primary windings of the pulse transformer, and a regenerating unit, which includes a first inductor for limiting a current during an "on" time of the third or fourth switching element and a second inductor for performing a regenerating operation during an "off" time of the third and fourth switching elements, is connected to the DC power supply and the primary side of the pulse transformer.

2. A switching element driving circuit according to claim 1, wherein the first inductor is connected in series with the second inductor, wherein, during operation, if a current from the third or fourth switching element is limited by the first inductor, energy accumulated in the first inductor is transferred directly to the second inductor or transferred indirectly to the second inductor through a capacitor, and the energy is supplied regeneratively to the DC power supply during the "off" time of the third and fourth switching elements.

3. A switching element driving circuit according to claim 2, wherein the first inductor and the second inductor are magnetically coupled.

4. A switching element driving circuit according to claim 2, wherein one end of the capacitor is coupled to a coupling terminal between a terminal of the first inductor and a primary side circuit of the pulse transformer, and the other end of the capacitor is coupled to the second inductor.

5. A discharge lamp lighting apparatus in which a DC-AC converter for receiving a DC input voltage to be converted into an AC voltage includes a pulse transformer and a circuit configuration for alternately switching first and second switching elements connected in series on a secondary side of the pulse transformer, wherein, during operation, a signal from a first one of secondary windings of the pulse transformer is supplied to the first switching element, and a signal from another of the secondary windings of the pulse transformer is supplied to the second switching element, and wherein third and fourth switching elements are provided on a primary side of the pulse transformer, the third switching element is coupled to one of the primary windings of the pulse transformer, the fourth switching element is coupled to the other of the primary windings of the pulse transformer, and a regenerating unit, which includes a first inductor for limiting a current during an "on" time of the third or fourth switching element and a second inductor for performing a regenerating operation during an "off" time of the third and fourth switching elements, is connected to the DC power supply and the primary side of the pulse transformer.

* * * * *